United States Patent
Ohsaki et al.

(10) Patent No.: US 7,117,727 B2
(45) Date of Patent: *Oct. 10, 2006

(54) MISFIRE DETECTING APPARATUS FOR INTERNAL COMBUSTION ENGINE AND METHOD THEREOF

(75) Inventors: Masanobu Ohsaki, Atsugi (JP); Hisanori Ozaki, Tokyo (JP)

(73) Assignees: Hitachi Unisia Automotive, Ltd., Kanagawa (JP); Fuji Heavy Industries Ltd., Tokyo (JP)

( * ) Notice: Subject to any disclaimer, the term of this patent is extended or adjusted under 35 U.S.C. 154(b) by 15 days.

This patent is subject to a terminal disclaimer.

(21) Appl. No.: 10/830,054

(22) Filed: Apr. 23, 2004

(65) Prior Publication Data

US 2004/0237635 A1 Dec. 2, 2004

(30) Foreign Application Priority Data

Apr. 24, 2003 (JP) ............................. 2003-120324

(51) Int. Cl.
G01M 15/00 (2006.01)

(52) U.S. Cl. .................. 73/117.3; 73/116; 73/117.2; 73/118.1

(58) Field of Classification Search ..................... None
See application file for complete search history.

(56) References Cited

U.S. PATENT DOCUMENTS 5,507,180 A * 4/1996 Tomisawa .................. 73/117.3
5,574,217 A * 11/1996 McCombie ................... 73/116
5,822,710 A * 10/1998 Mezger et al. .............. 701/110
5,841,025 A * 11/1998 Remboski et al. .......... 73/117.3
5,862,507 A * 1/1999 Wu et al. .................... 701/111
6,006,155 A * 12/1999 Wu et al. .................... 701/111
6,243,641 B1 * 6/2001 Andrews et al. ............ 701/102
6,584,834 B1 * 7/2003 Lehner et al. ................. 73/116

FOREIGN PATENT DOCUMENTS

JP  58-051243 A  3/1983
JP  4-171249 A  6/1992

OTHER PUBLICATIONS

U.S. Appl. No. 10/830,065, Kiyomura et al., filed Apr. 23, 2004.

* cited by examiner

*Primary Examiner*—Edward Lefkowitz
*Assistant Examiner*—Freddie Kirkland, III
(74) *Attorney, Agent, or Firm*—Foley & Lardner LLP (57) ABSTRACT

Whether a misfire occurred is judged based on a comparison between diagnosis data that indicates a variation of an engine rotation speed and a threshold based on engine operating conditions. The misfire judgment is canceled based on a result of a comparison between data indicating an average correlation between the diagnosis data and the threshold, and a threshold for cancellation judgment.

10 Claims, 5 Drawing Sheets

MISFIRE DETECTING APPARATUS FOR INTERNAL COMBUSTION ENGINE AND METHOD THEREOF

FIELD OF THE INVENTION

The present invention relates to a misfire detecting apparatus for an internal combustion engine and a method thereof, for judging whether or not a misfire occurred, based on a variation of an engine rotation speed.

RELATED ART

Japanese Unexamined Patent Publication No. 04-171249 and Japanese Unexamined Patent Publication No. 58-051243 each disclose a misfire detecting apparatus in which diagnosis data indicating a variation of an engine rotation speed is calculated, and the diagnosis data and a threshold according to engine operating conditions are compared with each other, to judge whether or not a misfire occurred.

In an internal combustion engine, the engine rotation speed is varied due to a misfire, and is also varied due to the loosening of a flywheel or the deterioration of a clutch.

Further, during the rough road running of a vehicle, there is a case where the engine rotation speed is varied due to a change in power caused by a slight variation of an accelerator opening, or a change in traction of a driving wheel.

In the conventional technique, although the threshold to be compared with the diagnosis data is set according to the engine operating conditions, there is a problem in that it is erroneously judged that a misfire occurred, when the engine rotation speed is varied due to the factor as described above other than the misfire.

SUMMARY OF THE INVENTION

The present invention has an object to provide a misfire detecting apparatus and a method thereof, which does not erroneously judge that a misfire occurred, when an engine rotation speed is varied due to a factor other than a misfire.

In order to achieve the above object, according to the present invention, in a configuration where it is judged whether or not a misfire occurred, based on the comparison between diagnosis data indicating a variation of an engine rotation speed and a threshold based on engine operating conditions, the misfire judgment is canceled, based on a result of the comparison between data indicating an average correlation between the diagnosis data and the threshold, and a threshold for cancellation judgment.

The other objects and features of this invention will become understood from the following description with reference to the accompanying drawings.

DESCRIPTION OF EMBODIMENTS

Figure 1:
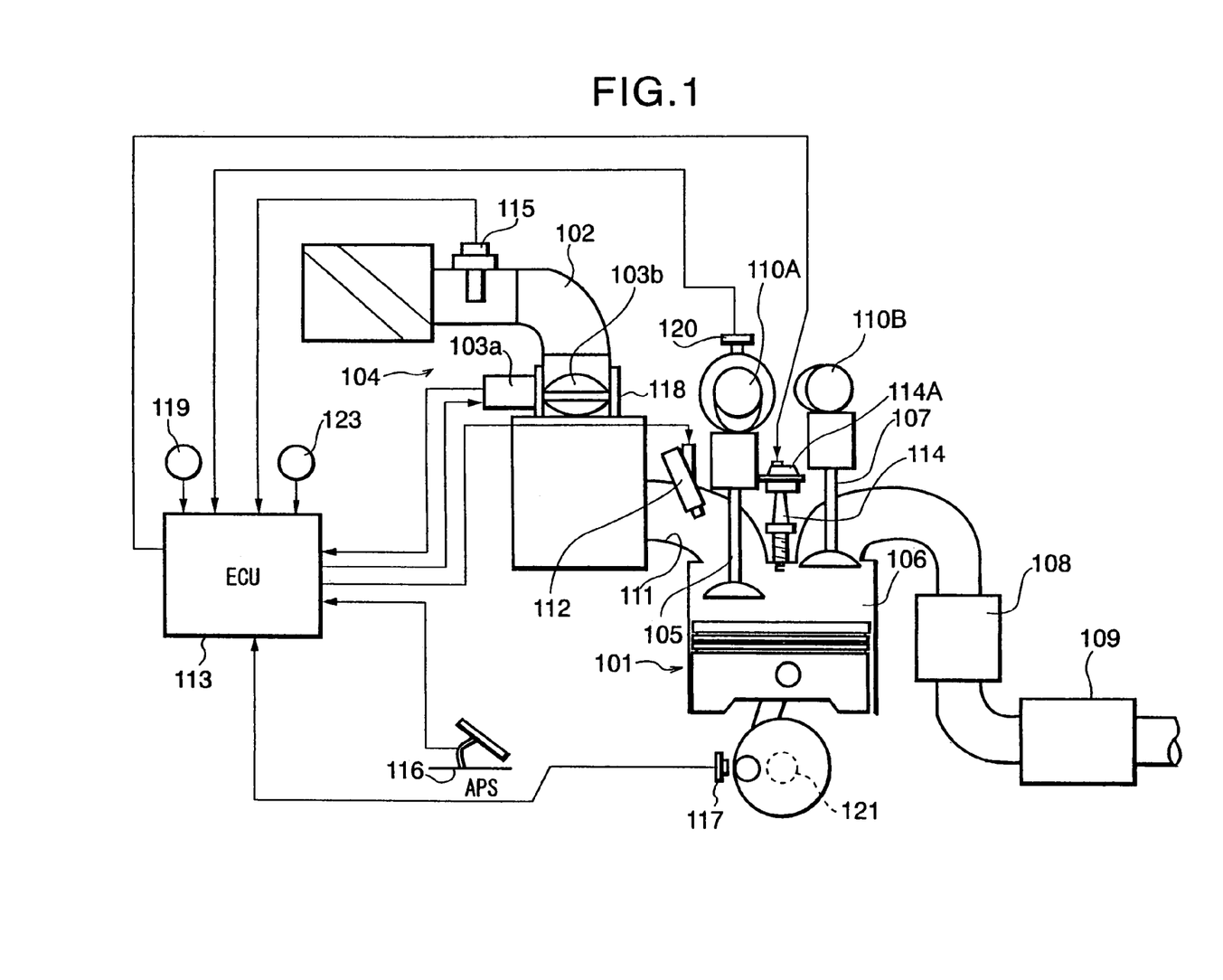
FIG. 1 is a diagram showing a system configuration of an internal combustion engine in an embodiment.

FIG. 1 is diagram showing a system configuration of an internal combustion engine in an embodiment.

In FIG. 1, an electronically controlled throttle chamber 104 is disposed in an intake pipe 102 of an internal combustion engine 101.

Electronically controlled throttle chamber 104 consists of a throttle valve 103b and a throttle motor 103a driving throttle valve 103b to open/close.

Air is sucked into a combustion chamber 106 of engine 101 via electronically controlled throttle chamber 104 and an intake valve 105.

An electromagnetic fuel injection valve 112 is disposed in an intake port 111 on the upstream side of intake valve 105.

Fuel injection valve 112 is driven to open by an injection pulse signal output from an engine control unit (to be abbreviated as ECU hereunder) 113, to inject fuel adjusted at a predetermined pressure toward intake valve 105.

Note, the configuration may be such that fuel injection valve 112 directly injects fuel into combustion chamber 106.

An air-fuel mixture formed in each cylinder is ignited to burn with the spark ignition by an ignition plug 114.

Ignition plug 114 is provided with an ignition coil 114A incorporating therein a power transistor.

ECU 113 performs a switching control of the power transistor, to control ignition timing (an ignition timing advance value) of each cylinder.

A combusted exhaust gas of engine 101 is discharged from combustion chamber 106 via an exhaust valve 107, and is purified by a front catalytic converter 108 and a rear catalytic converter 109, and then emitted into the atmosphere.

Intake valve 105 and exhaust valve 107 are driven to open/close by cams disposed to an intake side camshaft 110A and to an exhaust side camshaft 110B, respectively.

ECU 113 receives detection signals from an accelerator pedal sensor 116 detecting an accelerator opening APS, an air flow meter 115 detecting an intake air amount Q of engine 101, a crank angle sensor 117 taking out a position signal POS for each unit crank angle from a crankshaft 121, a throttle sensor 118 detecting an opening TVO of throttle valve 103b, a water temperature sensor 119 detecting a cooling water temperature Tw of engine 101, a cam sensor 120 taking out a cylinder judgment signal PHASE from intake side camshaft 110A, and the like.

ECU 113 calculates an engine rotation speed Ne based on the position signal POS.

Further, ECU 113 has a function of judging an occurrence of misfire based on a variation of the engine rotation speed Ne. Such a misfire judging function will be described in accordance with flowcharts of FIG. 2 and FIG. 3.

Figure 2:
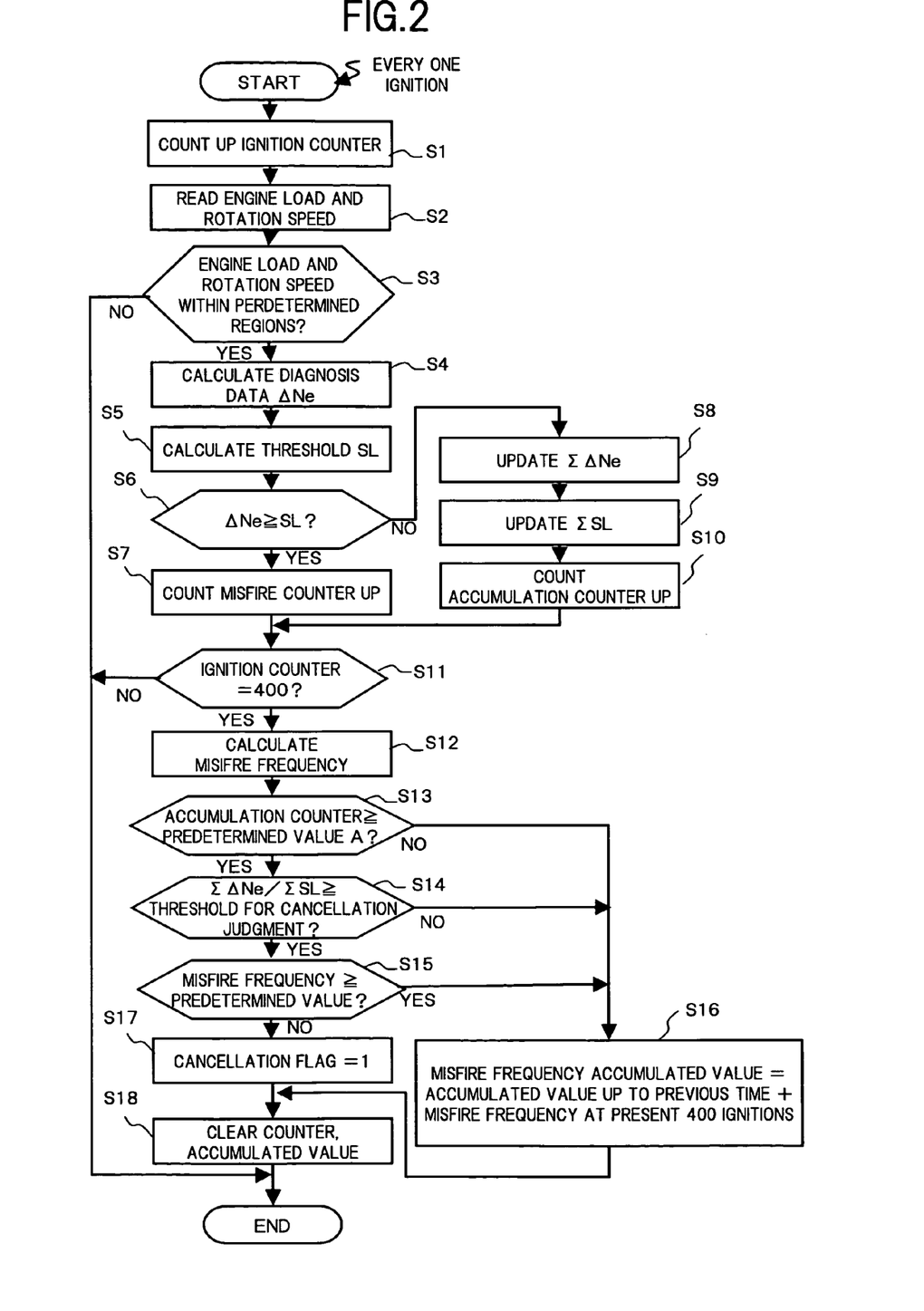
FIG. 2 is a flowchart showing an update control of a misfire frequency accumulated value in the embodiment.

The flowchart of FIG. 2 shows a routine executed every one ignition (i.e., for each ignition of an ignition plug 114).

In step S1, an ignition counter for counting the number of ignition times is counted up.

In step S2, an engine load Tp and the engine rotation speed Ne are read.

Note, the engine load Tp can be represented by a basic injection quantity in fuel injection valve 112, a cylinder intake air amount, a throttle opening or the like.

In step S3, it is judged whether or not the engine load Tp and the engine rotation speed Ne read in step S2 are within previously set ranges, respectively.

Then, if the engine load Tp and the engine rotation speed Ne are within the previously set ranges, control proceeds to step S4.

In step S4, diagnosis data ΔNe indicating the variation of the engine rotation speed Ne is calculated.

The diagnosis data ΔNe is calculated as a deviation between the engine rotation speeds Ne calculated at two crank angle positions within one ignition cycle.

In step S5, referring to a map storing a threshold SL for misfire judgment in each region, which is previously classified depending on the engine load Tp and the engine rotation speed Ne, the threshold SL corresponding to the engine load Tp and the engine rotation speed Ne at that time is calculated.

Note, the threshold SL is previously set, so that the diagnosis data ΔNe exceeds the threshold SL when a misfire occurred.

In step S6, it is judged whether or not the diagnosis data ΔNe is equal to or above the threshold SL.

Then, if the diagnosis data ΔNe is equal to or above the threshold SL, control proceeds to step S7, where a misfire counter for counting the number of misfire occurrence judging times is counted up.

On the other hand, if the diagnosis data ΔNe is less than the threshold SL, control proceeds to step S8.

In step S8, an accumulated value ΣΔNe up to the previous time is added with the present diagnosis data ΔNe, to update the accumulated value ΣΔNe.

In the next step S9, an accumulated value ΣSL up to the previous time is added with the present threshold SL, to update the accumulated value ΣSL.

In step S10, an accumulation counter for counting the number of accumulating times is counted up.

In step S11, it is judged whether or not a value of the ignition counter reaches 400, and if the value of the ignition counter=400, control proceeds to step S12.

The ignition counter is reset to 0 when control proceeds to S12 and the subsequent steps as described later. Therefore, control proceeds to step S12 and the subsequent steps every 400 ignitions.

In step S12, a ratio between the value of the misfire counter and 400 as the total number of ignition times is calculated as data indicating a misfire frequency.

In step S13, it is judged whether or not a value of the accumulation counter is equal to or above a predetermined value A.

Then, if the value of the accumulation counter is less than the predetermined value A, and the number of samples of each of the accumulated value ΣΔNe and the accumulated value ΣSL is less than the predetermined value A, control proceeds to step S16.

In step S16, the misfire frequency presently obtained in step S12 is added to a misfire frequency accumulated value up to the previous time, to update the misfire frequency accumulated value.

Figure 3:
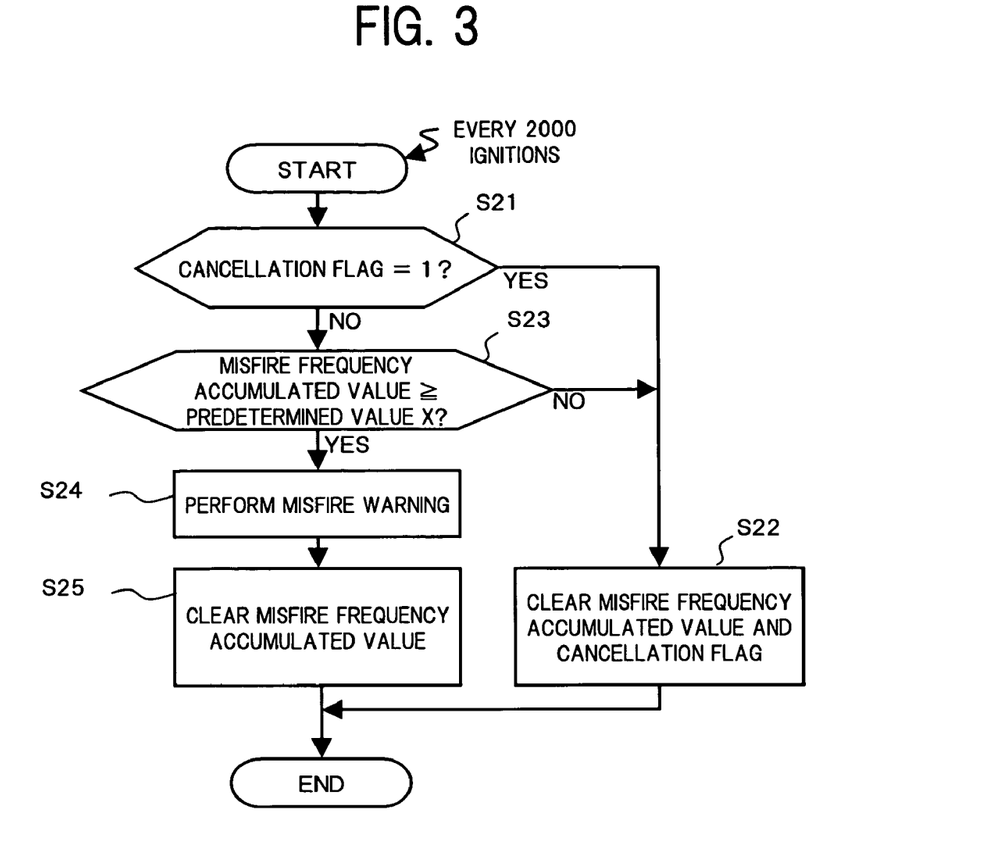
FIG. 3 is a flowchart showing a misfire judgment control in the embodiment.

The misfire frequency accumulated value is used for judging as to whether a final misfire judgment signal (misfire warning) is output, in a routine shown in the flowchart of FIG. 3.

On the other hand, in the case where the value of the accumulation counter is equal to or above the predetermined value A, that is, in the case where the number of samples of each of the accumulated value ΣΔNe and the accumulated value ΣSL is equal to or above the predetermined value A, control proceeds to step S14.

In step S14, it is judged whether or not a ratio between the accumulated value ΣΔNe and the accumulated value ΣSL is equal to or above the previously set threshold for cancellation judgment.

Here, if ΣΔNe/ΣSL is less than the threshold for cancellation judgment, control proceeds to step S16, where the misfire frequency accumulated value is updated.

On the other hand, if ΣΔNe/ΣSL is equal to or above the threshold for cancellation judgment, control proceeds to step S15, where it is judged whether or not the misfire frequency obtained in step S12 is equal to or above a predetermined value.

Then, if the misfire frequency is equal to or above the predetermined value, control proceeds to step S16, where the misfire frequency accumulated value is updated. If the misfire frequency is less than the predetermined value, control proceeds to step S17, where 1 is set to a cancellation flag.

ΣΔNe/ΣSL, which is a value that becomes larger when the diagnosis data ΔNe becomes larger averagely to approach the threshold SL, is data indicating an average correlation between the diagnosis data ΔNe and the threshold SL.

Note, a simple average of the diagnosis data ΔNe is obtained if ΣΔNe/the number of accumulating times, and a simple average of the threshold SL is obtained if ΣSL/the number of accumulating times. However, since [ΣΔNe/the number of accumulating times]/[ΣSL/the number of accumulating times]=ΣΔNe/ΣSL, the division by the number of accumulating times is omitted.

Namely, ΣΔNe/ΣSL corresponds to a ratio between the simple average of the diagnosis data ΔNe and the simple average of the threshold SL, and ΣΔNe is an average value of the diagnosis data ΔNe and ΣSL is an average value of the threshold SL.

Further, in the calculation of ΣΔNe and ΣSL, since a value of when the occurrence of misfire is judged, is eliminated, the average correlation between the diagnosis data ΔNe and the threshold SL, which is indicated by ΣΔNe/ΣSL, shows with accuracy an increase tendency of rotation variation due to a factor other than misfire.

Here, in the case where ΣΔNe/ΣSL is equal to or above the threshold for cancellation judgment, it is indicated that the diagnosis data ΔNe becomes larger averagely than that in the normal time.

Then, it is judged that an increase tendency of the diagnosis data ΔNe is caused by a factor other than misfire, such as the loosening of a flywheel, the deterioration of a clutch or the rough road running of a vehicle.

Here, if the rotation variation of the engine becomes larger averagely, the diagnosis data ΔNe exceeds the threshold SL due to a slight increase of rotation variation, which is not caused by a misfire. Therefore, there is a possibility of erroneous judgment of misfire.

Contrary to the above, in the case where ΣΔNe/ΣSL is less than the threshold for cancellation judgment, it is estimated that there is no increase of rotation variation caused by a factor other than misfire, such as the loosening of the flywheel, the deterioration of the clutch or the rough road running of the vehicle.

Then, if there is no increase of rotation variation caused by a factor other than misfire, the misfire judgment can be performed with accuracy based on the comparison between the diagnosis data ΔNe and the threshold SL.

Therefore, in the case where ΣΔNe/ΣSL is less than the threshold for cancellation judgment, control proceeds to step S16, where the misfire frequency presently obtained in step S12 is added to the misfire frequency accumulated value up to the previous time, to update the misfire frequency accumulated value.

On the other hand, in the case where ΣΔNe/ΣSL is equal to or above the threshold for cancellation judgment, there is a possibility of erroneous judgment of misfire. However, if the misfire frequency is equal to or above the predetermined value, it is estimated that a misfire actually occurred even if the rotation speed variation is increased caused by a factor other than misfire.

Accordingly, even if $\Sigma\Delta Ne/\Sigma SL$ is equal to or above the threshold for cancellation judgment, in the case where the misfire frequency is equal to or above the predetermined value, control proceeds to step S16, where the misfire frequency accumulated value is updated.

Further, in the case where $\Sigma\Delta Ne/\Sigma SL$ is equal to or above the threshold for cancellation judgment and also the misfire frequency is less than the predetermined value, it is judged that the presently obtained misfire frequency is resulted from an influence by the increase of rotation variation caused by a factor other than misfire.

Then, in such a case, 1 is set to the cancellation flag so that the presently obtained misfire frequency is not used for a final misfire judgment.

If the accumulation counter has a value less than the predetermined value A, it is impossible to judge with high accuracy an influence, such as the loosening of the flywheel, the deterioration of the clutch or the rough road running of the vehicle, on the diagnosis data $\Delta Ne$, based on $\Sigma\Delta Ne/\Sigma SL$.

Therefore, the setting of the cancellation flag based on whether or not $\Sigma\Delta Ne/\Sigma SL$ is equal to or above the threshold for cancellation judgment, is performed only when the accumulation counter has a value equal or above the predetermined value A.

Consequently, if the accumulation counter has the value less than the predetermined value A, control proceeds to step S16, where the misfire frequency accumulated value is updated, to avoid the cancellation of misfire judgment.

In step S18, the ignition counter, the accumulation counter, the misfire counter, and the accumulated values $\Sigma\Delta Ne$ and $\Sigma SL$, are cleared, to terminate the present routine.

The flowchart of FIG. 3 shows a routine executed every 2000 ignitions.

In step S21, it is judged whether or not 1 is set to the cancellation flag.

If 1 is set to the cancellation flag, control proceeds to step S22, where the misfire frequency accumulated value and the cancellation flag are cleared to terminate the present routine. As a result, the misfire warning based on the misfire frequency accumulated value (an output control of misfire judgment signal) is canceled.

Accordingly, when the diagnosis data $\Delta Ne$ becomes larger by the influence, such as the loosening of the flywheel, the deterioration of the clutch or the rough road running of the vehicle, it is possible to prevent the erroneous misfire warning.

On the other hand, if it is judged in step S21 that 0 is set to the cancellation flag, control proceeds to step S23, where it is judged whether or not the misfire frequency accumulated value is equal to or above a predetermined value X.

The misfire frequency is obtained every 400 ignitions while the present routine is executed every 2000 ignitions. Therefore, the misfire frequency accumulated value to be compared with the predetermined value X in step S23 becomes a value obtained by accumulating sequentially the misfire frequency obtained every 400 ignitions by the five numbers of times.

If it is judged in step S23 that the misfire frequency accumulated value is equal to or above the predetermined value X, control proceeds to step S24, where the misfire warning is given to a driver by means of a warning device 123, such as a lamp, a buzzer or the like.

Note, the configuration of the present embodiment has been such that the output of the final misfire judgment signal is an output of an operation signal of warning device 123. However, the present invention is not limited thereto, and the configuration may be such that, for example, the misfire judgment signal is made a prohibition signal of the lean air-fuel ratio combustion, to forcibly shift a target air-fuel ratio from a lean air-fuel ratio to a stoichiometric air-fuel ratio.

In step S25, the misfire frequency accumulated value is cleared, to terminate the present routine.

It is possible that $\Delta Ne/SL$ is calculated at each time when the diagnosis data $\Delta Ne$ is calculated, and the accumulated value of $\Delta Ne/SL$ is used as the data indicating the average correlation between the diagnosis data $\Delta Ne$ and the threshold SL.

Figure 4:
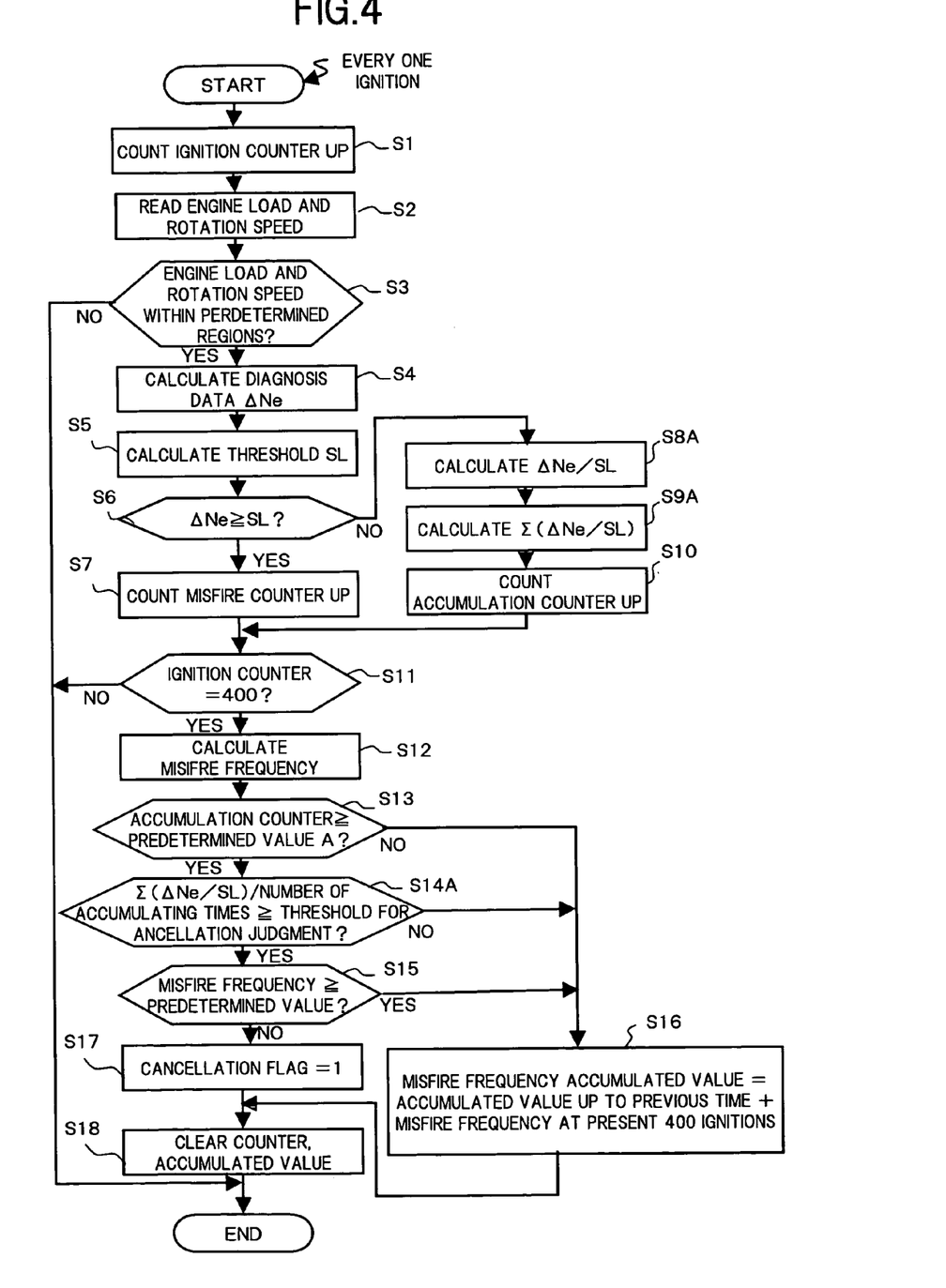
FIG. 4 is a flowchart showing a second embodiment of the update control of the misfire frequency accumulated value.

An embodiment having the above configuration is shown in a flowchart of FIG. 4.

The flowchart of FIG. 4 differs from the flowchart of FIG. 2 only in steps S8A, S9A and S14A. Therefore, the steps in the flowchart of FIG. 4, which execute the same processing as in the steps in the flowchart of FIG. 2, are denoted by the same numerals as in the flowchart of FIG. 2, and the description thereof is omitted.

In step S8A in the flowchart of FIG. 4, a ratio between the presently calculated diagnosis data $\Delta Ne$ and the threshold SL (ratio=$\Delta Ne/SL$) is calculated.

In step S9A, the accumulated value $\Sigma[\Delta Ne/SL]$ of $\Delta Ne/SL$ is updated.

Then, $\Delta Ne/SL$ is accumulated between each 400 ignitions, and control proceeds to step S14A, where it is judged whether or not the accumulated value $\Sigma[\Delta Ne/SL]$/the number of accumulating times is equal to or above the previously set threshold for cancellation judgment.

In the present embodiment, an average value of $\Delta Ne/SL$ is data indicating an average correlation between the diagnosis data $\Delta Ne$ and the threshold SL.

In the case where the accumulated value $\Sigma[\Delta Ne/SL]$/the number of accumulating times is less than the threshold for cancellation judgment, it is judged that there is no influence by the loosening of the flywheel or the clutch, or the rough road running of the vehicle, and control proceeds to step S16.

On the other hand, if the accumulated value $\Sigma[\Delta Ne/SL]$/the number of accumulating times is equal to or above the threshold for cancellation judgment, it is further judged in step S15 whether or not the misfire frequency is equal to or above the predetermined value.

If the misfire frequency is less than the predetermined value, and it is not an apparent misfired condition, it is estimated that there is an influence by the loosening of the flywheel or the clutch, or the rough road running of the vehicle, and control proceeds to step S17, where 1 is set to the cancellation flag.

Further, if the misfire frequency is equal to or above the predetermined value, it is judged that a misfire actually occurred even if there is an influence by the loosening of the flywheel or the clutch, or the rough road running of the vehicle, and therefore, control proceeds to step S16.

Also in the above embodiment, the rotation variation becomes larger due to an influence, such as the loosening of the flywheel or the clutch, or the rough road running of the vehicle. Thus, it is possible to avoid the erroneous judgment of misfire.

Note, in the above embodiment, the configuration has been such that timing for obtaining the average correlation between the diagnosis data $\Delta Ne$ and the threshold SL is every 400 ignitions, and the final misfire judgment is performed every 2000 ignitions. However, it is apparent that the present invention is not limited to such number of ignition times.

Further, it is also possible to omit the judgment of accumulation counter in step S13 and/or the judgment of misfire frequency in step S15.

The configuration can be such that the threshold for cancellation judgment is set according to engine operation conditions. An embodiment having such a configuration is shown in a flowchart of FIG. 5.

Figure 5:
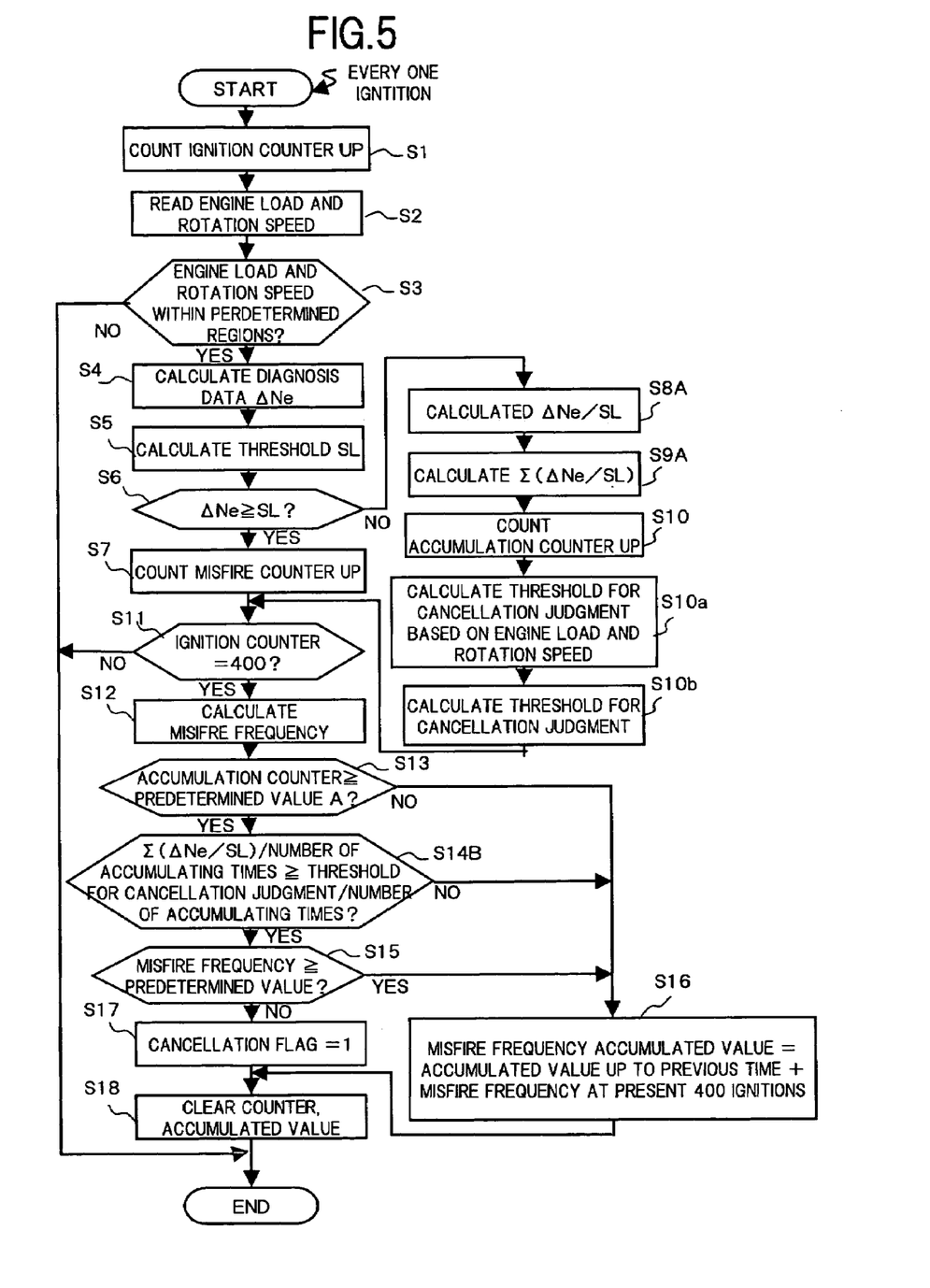
FIG. 5 is a flowchart showing an embodiment for calculating a threshold for cancellation judgment according to engine operating conditions.

In the flowchart of FIG. 5, steps S10a and S10b for setting the threshold for cancellation judgment are added to the flowchart of FIG. 4.

In step S10a, the threshold for cancellation judgment is calculated based on the engine load and the engine rotation speed.

The calculation of the threshold for cancellation judgment can be performed by previously setting a map in which the threshold for cancellation judgment is stored according to the engine load and the engine rotation speed, to retrieve the map.

In the next step S10b, the threshold for cancellation judgment is accumulated.

Then, in step S14B, an average value is obtained by dividing the accumulated value of the threshold for cancellation judgment by the number of accumulating times, and this average value of the threshold for cancellation judgment and the average value of $\Delta Ne/SL$ are compared with each other.

According to the above configuration, the threshold for cancellation judgment optimum for the engine operating conditions (engine load, engine rotation speed) can be calculated, to improve the judgment accuracy.

Note, as in the case of the flowchart of FIG. 2, it is apparent that, in the configuration where $\Sigma\Delta Ne/\Sigma SL$ and the cancellation judgment value are compared with each other, the threshold for cancellation judgment can be calculated according to the engine operating conditions (engine load, engine rotation speed) as in the flowchart of FIG. 5.

The entire contents of Japanese Patent Application No. 2003-120324 filed on Apr. 24, 2003, a priority of which is claimed, are incorporated herein by reference.

While only selected embodiments have been chosen to illustrate the present invention, it will be apparent to those skilled in the art from this disclosure that various changes and modifications can be made herein without departing from the scope of the invention as defined in the appended claims.

Furthermore, the foregoing description of the embodiments according to the present invention is provided for illustration only, and not for the purpose of limiting the invention as defined in the appended claims and their equivalents.

What is claimed is:

1. A misfire detecting apparatus for an internal combustion engine comprising:
   an operating condition detector that is configured to detect engine operating conditions inclusive of an engine rotation speed; and
   a calculating section that is configured to:
   judge whether a misfire occurred, based on the engine rotation speed detected by said operating condition detector;
   output a misfire judgment signal;
   calculate diagnosis data indicating a variation of said engine rotation speed;
   calculate a threshold based on said engine operating conditions;
   judge whether a misfire occurred, based on a first comparison between said diagnosis data and said threshold;
   calculate data indicating an average correlation between said diagnosis data and said threshold, to cancel the misfire judgment, based on a result of a second comparison between said data indicating the average correlation and a threshold for cancellation judgment; and
   eliminate said diagnosis data and said threshold when said diagnosis data is equal to or above said threshold, from samples for calculating said data indicating the average correlation.

2. A misfire detecting apparatus for an internal combustion engine according to claim 1, wherein said calculating section is also configured to prohibit the cancellation of the misfire judgment on the basis of said data indicating the average correlation, when the number of samples of said diagnosis data and said threshold used for the calculation of said data indicating the average correlation is less than a predetermined value.

3. A misfire detecting apparatus for an internal combustion engine comprising:
   an operating condition detector that is configured to detect engine operating conditions inclusive of an engine rotation speed; and
   a calculating section that is configured to:
   judge whether a misfire occurred, based on the engine rotation speed detected by said operating condition detector;
   output a misfire judgment signal;
   calculate diagnosis data indicating a variation of said engine rotation speed;
   calculate a threshold based on said engine operating conditions;
   judge whether a misfire occurred, based on a first comparison between said diagnosis data and said threshold;
   calculate data indicating an average correlation between said diagnosis data and said threshold, to cancel the misfire judgment, based on a result of a second comparison between said data indicating the average correlation and a threshold for cancellation judgment; and
   prohibit the cancellation of the misfire judgment, when a misfire frequency during a period of time in which said average correlation is obtained, is equal to or above a predetermined value.

4. A misfire detecting apparatus for an internal combustion engine comprising:
   an operating condition detector that is configured to detect engine operating conditions inclusive of an engine rotation speed; and
   a calculating section that is configured to:
   judge whether a misfire occurred, based on the engine rotation speed detected by said operating condition detector;
   output a misfire judgment signal;
   calculate diagnosis data indicating a variation of said engine rotation speed;
   calculate a threshold based on said engine operating conditions;
   judge whether a misfire occurred, based on a first comparison between said diagnosis data and said threshold;

calculate data indicating an average correlation between said diagnosis data and said threshold, to cancel the misfire judgment, based on a result of a second comparison between said data indicating the average correlation and a threshold for cancellation judgment; and obtain said data indicating the average correlation, as an average value per the predetermined number of ignitions.

5. A misfire detecting apparatus for an internal combustion engine according to claim 4, wherein said calculating section is also configured to:

accumulate the misfire frequency per said predetermined number of ignitions, to output the misfire judgment signal when said accumulated value is equal to or above a predetermined value; and prohibit an output of the misfire judgment signal on the basis of said accumulated value, based on the result of the second comparison between said data indicating the average correlation and said threshold for cancellation judgment.

6. A misfire detecting method for an internal combustion engine comprising the steps of:

detecting engine operating conditions inclusive of an engine rotation speed;

calculating diagnosis data indicating a variation of said engine rotation speed;

calculating a threshold based on said engine operating conditions;

judging whether a misfire occurred, based on a first comparison between said diagnosis data and said threshold;

calculating data indicating an average correlation between said diagnosis data and said threshold; and canceling the misfire judgment, based on a result of a second comparison between said data indicating the average correlation and a threshold for cancellation judgment, wherein said step of calculating the data indicating the average correlation comprises the step of:

eliminating said diagnosis data and said threshold when said diagnosis data is equal to or above said threshold, from samples for calculating said data indicating the average correlation.

7. A misfire detecting method for an internal combustion engine according to claim 6, further comprising the step of:

prohibiting the cancellation of the misfire judgment on the basis of said data indicating the average correlation, when the number of samples of said diagnosis data and said threshold used for the calculation of said data indicating the average correlation is less than a predetermined value.

8. A misfire detecting method for an internal combustion engine comprising the steps of:

detecting engine operating conditions inclusive of an engine rotation speed;

calculating diagnosis data indicating a variation of said engine rotation speed;

calculating a threshold based on said engine operating conditions;

judging whether a misfire occurred, based on a first comparison between said diagnosis data and said threshold;

calculating data indicating an average correlation between said diagnosis data and said threshold;

canceling the misfire judgment, based on a result of a second comparison between said data indicating the average correlation and a threshold for cancellation judgment; and prohibiting the cancellation of the misfire judgment, when a misfire frequency during a period of time in which said average correlation is obtained, is equal to or above a predetermined value.

9. A misfire detecting method for an internal combustion engine comprising the steps of:

detecting engine operating conditions inclusive of an engine rotation speed;

calculating diagnosis data indicating a variation of said engine rotation speed;

calculating a threshold based on said engine operating conditions;

judging whether a misfire occurred, based on a first comparison between said diagnosis data and said threshold;

calculating data indicating an average correlation between said diagnosis data and said threshold, said step of calculating the data indicating the average correlation comprising the step of:

calculating said data indicating the average correlation, as an average value per the predetermined number of ignitions; and canceling the misfire judgment, based on a result of a second comparison between said data indicating the average correlation and a threshold for cancellation judgment.

10. A misfire detecting method for an internal combustion engine according to claim 9, wherein said step of judging whether a misfire occurred comprises the steps of:

accumulating the misfire frequency per said predetermined number of ignitions by the predetermined number of times; and outputting a misfire judgment signal when said accumulated value is equal to or above a predetermined value, and wherein said step of canceling the misfire judgment comprises the step of:

prohibiting an output of the misfire judgment signal on the basis of said accumulated value, based on the result of the second comparison between said data indicating the average correlation and said threshold for cancellation judgment.

* * * * *